(12) United States Patent
Sims

(10) Patent No.: US 8,205,299 B2
(45) Date of Patent: Jun. 26, 2012

(54) HINGE AND SPRING ASSEMBLY

(75) Inventor: Jeremy Thomas Sims, Ottumwa, IA (US)

(73) Assignee: Deere & Company, Moline, IL (US)

( * ) Notice: Subject to any disclaimer, the term of this patent is extended or adjusted under 35 U.S.C. 154(b) by 216 days.

(21) Appl. No.: 12/538,893

(22) Filed: Aug. 11, 2009

(65) Prior Publication Data

US 2011/0035903 A1 Feb. 17, 2011

(51) Int. Cl.
*E05F 1/08* (2006.01)

(52) U.S. Cl. ............. 16/293; 16/286; 16/366; 49/386; 296/190.11; 296/146.11; 296/56; 296/106

(58) Field of Classification Search ............ 16/286, 16/289, 291–293, 365, 366, 368, 369; 296/190.11, 296/146.11, 56, 106, 146.8, 164, 183; 49/381, 49/386

See application file for complete search history.

(56) References Cited

U.S. PATENT DOCUMENTS

| | | | | |
|---|---|---|---|---|
| 4,185,415 A | * | 1/1980 | LaConte | 49/248 |
| 4,359,119 A | * | 11/1982 | Kammerman | 180/69.21 |
| 4,805,264 A | * | 2/1989 | Benning et al. | 16/267 |
| 5,967,392 A | * | 10/1999 | Niemi et al. | 224/404 |
| 6,167,977 B1 | * | 1/2001 | Adamson et al. | 180/69.2 |
| 6,182,952 B1 | * | 2/2001 | Gutierrez | 267/64.11 |
| 6,808,223 B1 | * | 10/2004 | Baum et al. | 296/146.12 |
| 7,100,245 B2 | * | 9/2006 | Wohlfarth | 16/367 |
| 2008/0172833 A1 | * | 7/2008 | Migli | 16/277 |
| 2008/0235996 A1 | * | 10/2008 | Evans et al. | 37/232 |
| 2009/0056074 A1 | * | 3/2009 | Chase | 16/321 |

* cited by examiner

*Primary Examiner* — Chuck Y. Mah

(57) ABSTRACT

A hinge and spring assembly is provided for supporting at least one synthetic enclosure access door's on an enclosure. The enclosure has at least a first wall and at least one second wail, the second wall being formed in part by the access door. The access door has a mounting rib integrated therein. The hinge and spring assembly comprises a primary support element having at least one first hinge member and a spring support member. A door mounting member is secured to the mounting rib of the synthetic enclosure access door and comprises a spring mounting member and a second hinge member. The second hinge member of the door mounting member is movably attached to the first hinge member of the primary support element to form an articulating hinge joint. At least one spring member has first and second ends, the first end being secured to the spring support member of the primary support element, and the second end bend secured to the spring mounting member of the door mounting member.

9 Claims, 4 Drawing Sheets

HINGE AND SPRING ASSEMBLY

FIELD OF THE INVENTION

The present invention relates to hinge and spring assemblies as are used to support vertically hung doors. More particularly, the invention relates to hinge and spring assemblies that support such doors in an open position. Specifically, the invention relates to a hinge and spring assembly for supporting engine enclosure doors or the like as are found on agricultural machines wherein the doors are made of lightweight synthetic material.

BACKGROUND OF THE INVENTION

Industrial and agricultural machines are well known in which the mechanical inner workings or the machine are housed in an enclosure se as to prevent the introduction of dirt and debris into the mechanisms and to shield persons from dangerous moving parts for safety reasons. Such enclosures typically include access doors that can be opened to provide access to the inner workings of the machine for maintenance and repair. It is further well known to provide such doors with hinges and means for retaining the door in an open position such as prop rods or gas or mechanical springs. With metal doors it is possible to structurally attach rather substantial hinge and spring assemblies directly to the door due to the inherent structural integrity of the steel door. More recently, however it has become common to replace sheet metal doors with less expensive and lightweight plastic or synthetic doors. Such doors can be molded in a variety of shapes and colors and because of their light weight, reduce the overall weight of the machine thereby increasing fuel efficiency and lowering costs. Because such doors are lighter than sheet metal doors the hinge and spring does not need to be as substantial as would be necessary with a sheet metal door, however, the lightweight plastic doors typically do not have the structural support necessary for attaching the traditional hinge and spring hardware and it is therefore necessary to add additional hardware to provide the necessary structural support.

Accordingly, there is a clear need in the art for a hinge and spring assembly that is capable of supporting a lightweight plastic or synthetic enclosure access door in an open position without the need for additional structural mounting hardware and that takes advantage of existing structures and hardware already being employed on the machine.

SUMMARY OF THE INVENTION

In view of the foregoing it is an object of the invention to provide a hinge and spring assembly for an enclosure access door on an industrial or agricultural vehicle.

It is another object of the invention to provide such a hinge and spring assembly which is operable to support the enclosure access door in an open position.

It is a further object of the invention to provide such a hinge and spring assembly wherein the assembly can be mounted to the door and machine using existing structural supports.

The foregoing objects are accomplished by the present invention described in more detail below and wherein a hinge and spring assembly is provided or supporting at least one synthetic enclosure access door on an enclosure. The enclosure has at least a first wall and at least one second wall generally perpendicular to the first wall, with at least one of the second walls being formed in part by the access door and the access door has a mounting rib integrated therein. The hinge and spring assembly comprising a primary support element having at least one first hinge member and a spring support member; at least one door mounting member, the at least one door mounting member being secured to the mounting rib of the at least one synthetic enclosure access door and comprising a spring mounting member and a second hinge member, the second hinge member of the at least one door mounting member being movably attached to the at least one first hinge member of the primary support element to form an articulating hinge joint; and, at least one spring member, the at least one spring member having first and second ends, the first end of the at least one spring member being secured to the spring support member of the primary support element, and the second end of the at least one spring member being secured to the spring mounting member of the at least one door mounting member.

In general a hinge and spring assembly is provided for supporting at least one synthetic enclosure access doors on an enclosure. The enclosure has at least a first wall and at least one second wall, the second wall being formed in part by the access door. The access door has a mounting rib integrated therein. The hinge and spring assembly comprises a primary support element having at least one first hinge member and a spring support member. A door mounting member is secured to the mounting rib of the synthetic enclosure access door and comprises a spring mounting member and a second hinge member. The second hinge member of the door mounting member is movably attached to the first hinge member of the primary support element to form an articulating hinge joint. At least one spring member has first and second ends, the first end being secured to the spring support member of the primary support element, and the second end being secured to the spring mounting member of the door mounting member.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference shod be made to the following detailed description and accompanying drawings, wherein.

DESCRIPTION OF THE PREFERRED EMBODIMENT

Figure 1:
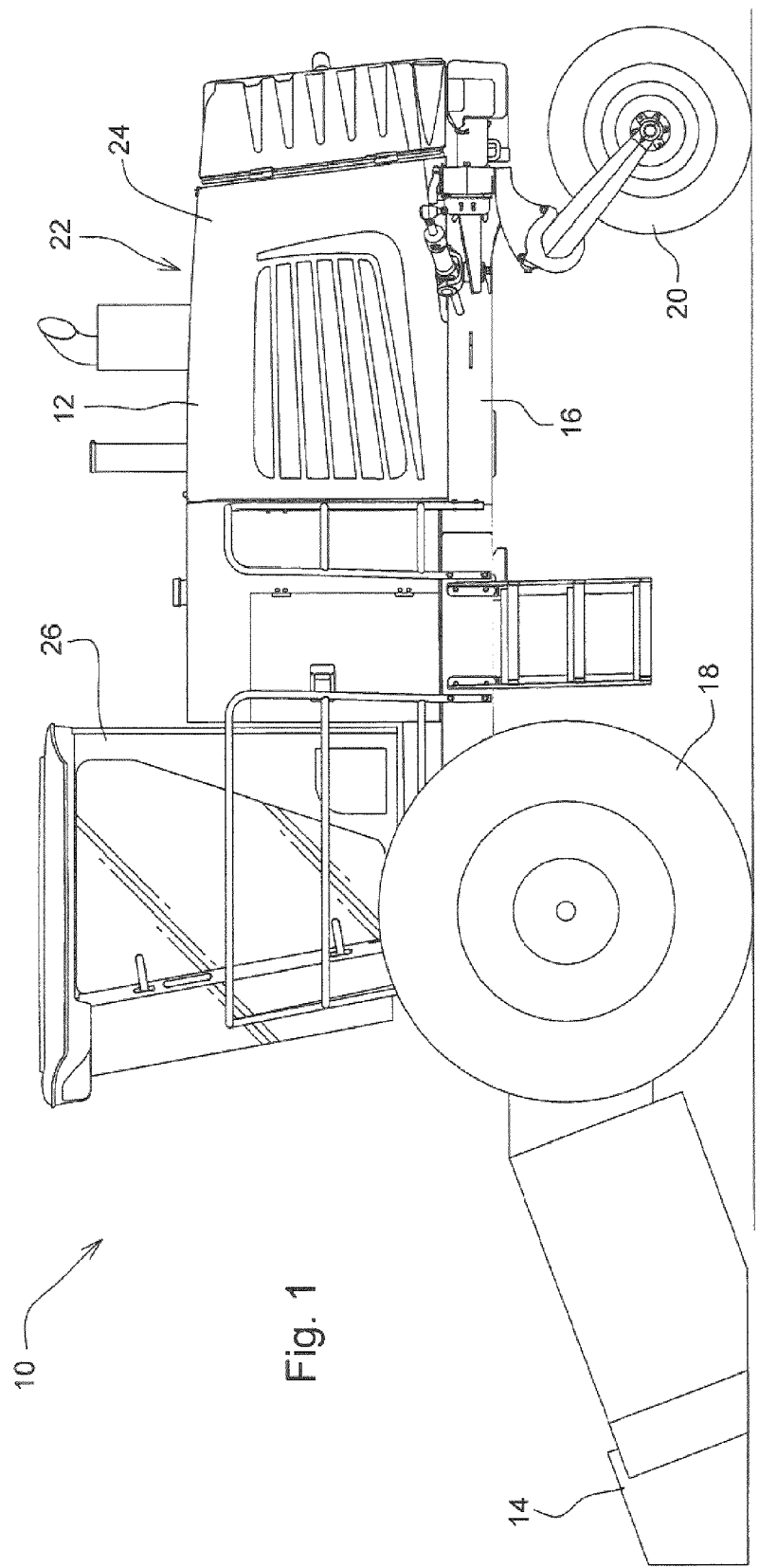
FIG. 1 is a side view of an agricultural windrower employing the hinge and spring assembly of the invention.
Figure 2:
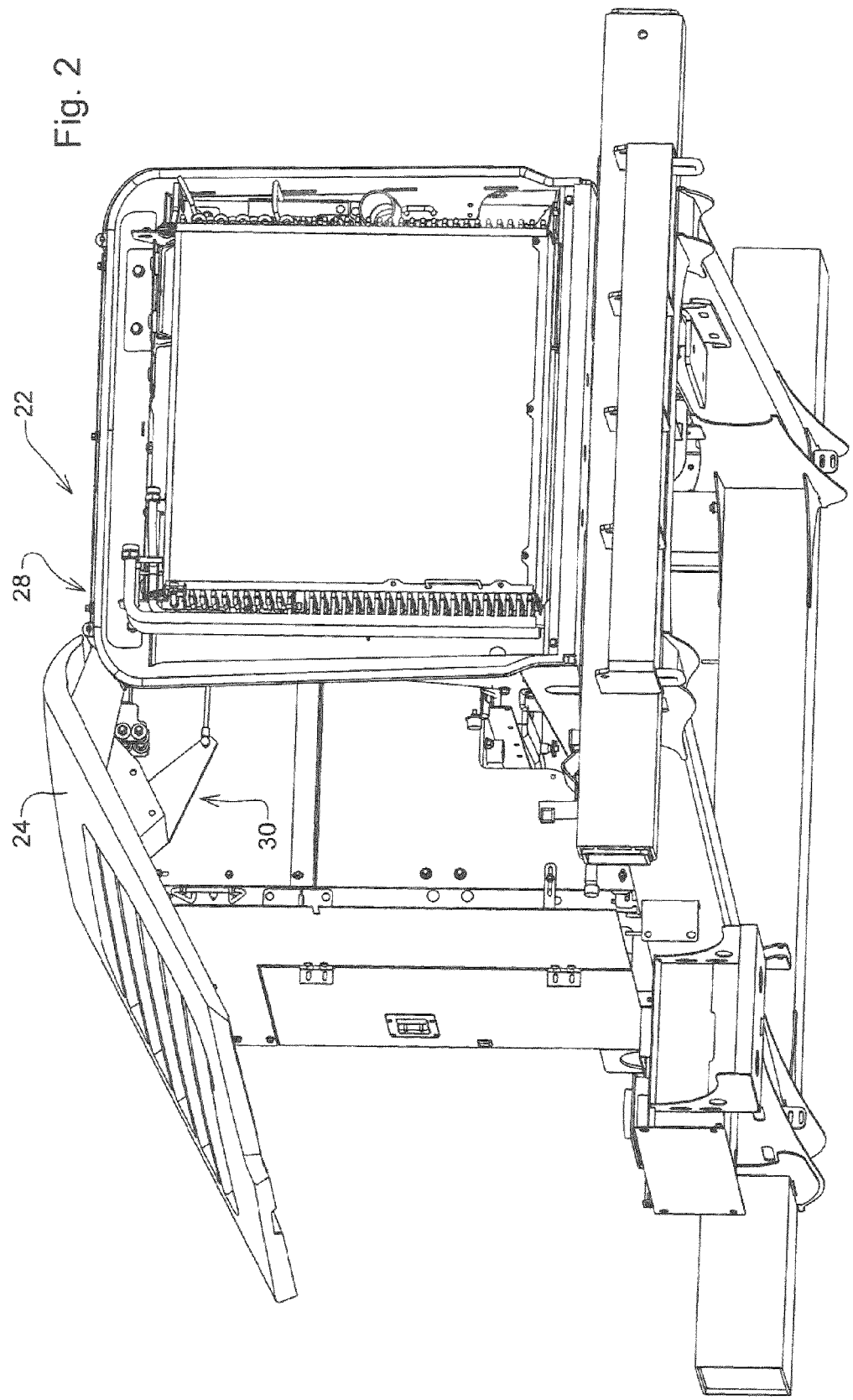
FIG. 2 is a view of a portion of the windrower of FIG. 1 wherein the engine enclosure access door is in the open position.

With reference now to the drawings and more particularly to FIG. 1 it can be seen that an agricultural machine 10 in the form of a windrower is comprised generally of the prime mover, i.e. tractor 12 and header 14. Tractor 12 has a man frame 16, that is supported by a pair of drive wheels 18 (only one shown) on the forward portion thereof and a pair of rear wheels 20 adjacent the rear end. The main frame 16 includes structural elements that provide a fairly rigid and structurally strong skeletal assembly for the support of the various components. An engine and other mechanical components are located within an enclosure 22 having at least one access door 24. On the windrower illustrated herein, the enclosure 22 has access doors 24 on both sides of the enclosure to allow access to the interior of the enclosure 22 from both sides of the machine 10, although only one side of the machine 10, and thus only one door 24 is shown in FIGS. 1 and 2. A cab 26, also supported on the main frame, encloses the operator's platform. The header 14 may be of several designs, but typically comprises a cutting mechanism, either a sicklebar or rotary cutter, a feeder mechanism and conditioning rolls.

With reference now to FIG. 2 it can be seen that the access door(s) 24 of the enclosure 22 is hingedly mounted to an upper wall 28 of the enclosure 22 by way of a hinge and spring assembly 30 such that the door(s) 24 may be opened upwardly in a wing manner and supported in an open position to provide access to the interior of the enclosure 22. The hinge and spring assembly 30 will be described in more detail below.

Figure 3:
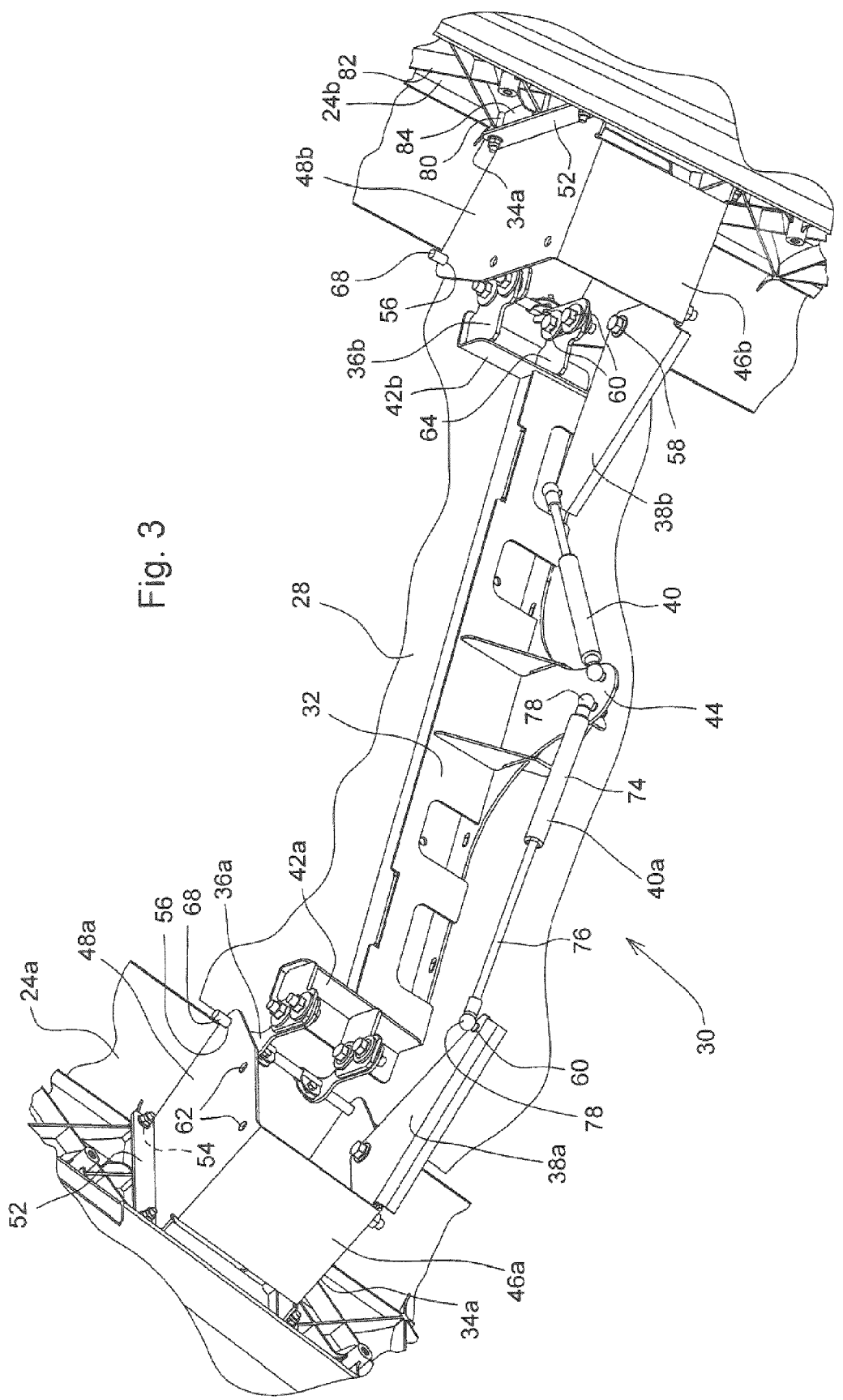
FIG. 3 is an embodiment of the hinge and spring assembly according to the invention; and, FIG. 4 is an alternative embodiment of the hinge and spring assembly according to the invention.

Referring now to FIG. 3 it will be seen that the hinge and spring assembly 30 is fully illustrated in conjunction with partial surfaces of the doors 24a and 24b and upper wall 28 of the enclosure. The hinge and spring assembly 30 generally comprises a primary mounting bracket 32, a pair of door brackets 34, a pair of hinges 36, a pair of spring brackets 38, and a an of springs 40. More particularly, the primary mounting bracket 32 as illustrated is a elongated unitary member adapted for attachment to the upper wall 28 of the enclosure. According, in the embodiment illustrated, the bracket 32 is a steel member which has been bent to lend stiffness and can be welded, bolted or otherwise secured to the upper wall of the enclosure. It will also be noted that the primary mounting bracket 32 has a length which generally corresponds to the width of the upper wall 28 of the enclosure. At each distal end of the bracket 32 is provided a hinge mounting flange 42 for purposes which will be described in more detail below. Further, between the distal ends is provided a spring flange 44 which, when the primary mounting bracket 32 is secured to the upper wall 28 of the enclosure, extends downwardly into the enclosure. The door brackets 34 are preferably formed from sheet metal or other appropriate material that has been bent or shaped into a three sided structure having a lower wall 46 and a pair of opposed side walls 48. The side walls 48 are each provided with a door mounting flange 52 which, in the embodiment illustrated, is disposed at a right angle to the side wall 48. The door mounting flanges are provided with appropriate fastener apertures 54. The side wails 48 of the door brackets 34 are further provided with apertures 56 and 58, adapted for mounting the hinges 36 and spring brackets 38 respectively as will be further described below. As shown the spring brackets 38 are generally triangularly shaped sheet metal members that have been bent to provide some structural rigidity. At a first and of the spring bracket 38 one or more fastener apertures 62 are provided for attaching the spring bracket 38 to the door bracket 34. At a second end of the spring brackets 38 apertures 60 are provided for attaching the springs 40 as will be described in further detail below. While the spring brackets 38 illustrated herein are separate members attached to the door brackets 34 it is contemplated that the door brackets could be integrated with the spring brackets and thus could be provided as a unitary spring and door brackets.

The hinges 36 are each comprised of a pair of hinge bodies 64 each having fastener apertures 66 adapted for fastening the hinge bodies 64 to the hinge mounting flanges 42 of the primary mounting bracket 32. Each hinge body 64 also includes a hinge pin aperture 68 for receiving a hinge pin 70. While in the embodiment illustrated the hinge bodies 64 are separate members, it is contemplated that the hinge bodies could be manufactured integrally with the primary support bracket hinge flanges etc. In addition to the hinge bodies 64 and hinge pin 70, each hinge 36 may include one or more retaining members 72 for retaining the hinge pin 70 in an adjustably spaced arrangement relative to the hinge bodies 64. The springs 40 as illustrated are conventional gas struts having a gas cylinder portion 74 and an actuating rod portion 76 each having fastening means 78 for securing the distal ends of the spring 40 to the spring flange 44 and spring brackets 38 as will be described in more detail below.

The assembly of the hinge and spring assembly 30 will now be described in more detail with continuing reference to FIG. 3. As shown the primary mounting bracket 32 is bolted, welded or otherwise secured to the upper wall 28 of the enclosure such that the hinge mounting flanges 42 at the distal ends of the bracket 32 are each disposed adjacent to the access openings (not shown) on either side of the enclosure to be covered by the access doors 24. It will be recognized that while the illustrated embodiment shows an enclosure having at least an upper wall and a pair of opposed sidewalls formed at least in part by the doors 24 it is possible within the scope of the invention to orient the wails differently such as with a sidewall and a pair of opposed upper and lower wags or with a lower wail and a pair of opposed sidewalks, the configuration of walls being specific to the application. The door brackets 34 are secured to mounting bosses 80 molded into each door 24 via the fastener apertures 54 of the door mounting flanges 34 and appropriate fasteners. At this point it should be noted that the lightweight plastic doors 24 contemplated by the invention are preferably provided with stiffening ribs 82 and a bracket mounting rib 84 that have been molded into the door during manufacture. The bracket mounting rib 84 is associated with the mounting bosses 80 and assists in providing a secure surface upon which the door bracket 34 is mounted. A pair of hinge bodies 64 are secured to each of the hinge mounting flanges 42 at the distal ends of the primary mounting bracket 32 via the fastener apertures 66 and appropriate fasteners. The spring brackets 38 are secured to the door brackets 34 by way of the apertures 58 and 62 and appropriate fasteners.

The doors 24 are hung by aligning the apertures 56 of the door bracket 34 with the hinge pin apertures 68 of the hinge bodies 64 and inserting the hinge pin 70 to form an articulating hinge joint. The hinge pin 70 may be secured relative to the door bracket via any number of means such as swaging, welding, or by application of a key, collar or other means to prevent movement or removal of the pin. Adjustment of the fit of the door 24 to the access opening can be accomplished by utilizing the retaining members 72 between the hinge bodies 64 to axially retain the pin 70 in a desired position. With the doors hung the springs 40 can be secured to the spring brackets 38 by connecting the fastening means 78 of the actuating rod portion 76 to the spring bracket 33 by way of the aperture 60. Similarly, the fastening means 78 of the gas cylinder portion 74 is secured to the coring flange 44 of the primary mounting bracket 32. Thus the springs 40 are interposed between the spring flange 44 and the door 24 by way of the spring and door brackets.

With continued reference to FIG. 3 the operation of the hinge and spring assembly should now be apparent. More particularly, it will be seen that the door 24a is shown being supported in the open position by the gas spring 40a because the spring bracket 38a has gone slightly over center in the clockwise direction relative to the rod end 76 of spring 40a as the spring is extended. Conversely, the door 24b is maintained in the closed position because the spring bracket 38b has gone slightly over center in the clockwise direction relative to the rod end 76 of spring 40b as the spring is retracted. The benefits of the combined hinge and spring assembly 30 become apparent as it is noted that both doors 24 are supported by a single support structure having a common spring support 44. The door brackets 34 in combination with the mounting rib 84 molded into each door 24 allow the hinge and spring assembly 30 to be mounted to the doors 24 without the need for more elaborate and expensive support structures.

Figure 4:
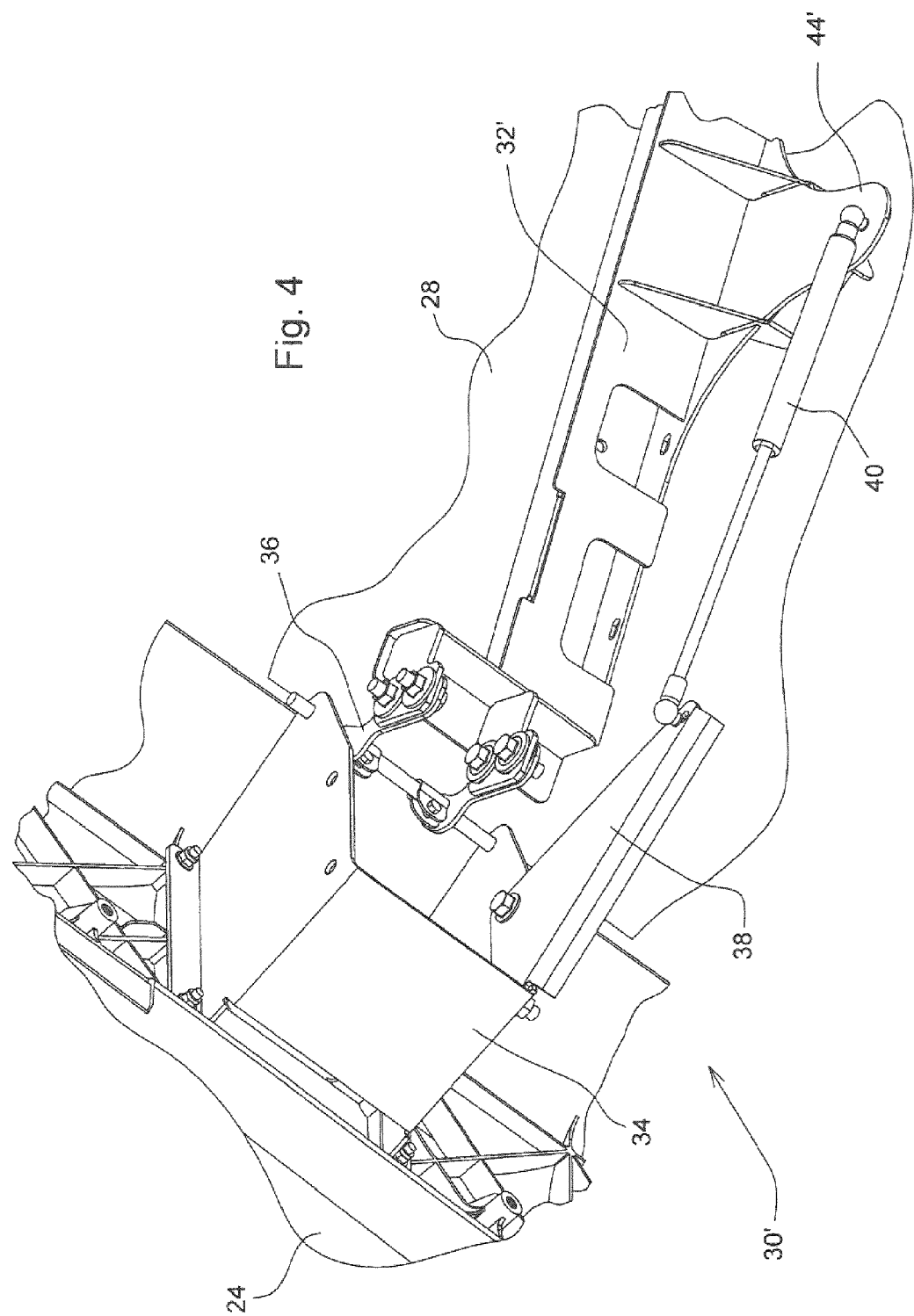

FIG. 4 illustrates an alternative embodiment of the invention similar to that described above, wherein like structures are designated with like reference numerals. In the embodiment of FIG. 4 the hinge and spring assembly 30' is adapted for use with a single door 24. Accordingly, the primary mounting bracket 32' is again affixed to the upper wall 28 of the enclosure. It should, however, be apparent that the bracket 32' differs from the bracket 32 described above in that it may be of a shorter length and does not necessarily span the width of the enclosure. The other primary difference between the bracket 32' and the previously described bracket 32 is that the spring flange 44' is adapted attaching only a single spring 40. In all other respects the hinge and spring assembly 30' is substantially the same as the assembly 30 described above with respect to its assembly and operation, it being understood that the assembly 30' only utilizes one each of the door bracket 34, hinge 36, spring bracket 38, and spring 40.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A hinge, door, and spring assembly including at least one synthetic enclosure access door on an enclosure, the enclosure having at least a first wall and at least one second wall generally perpendicular to the first wall, at least one of the second walls being formed in part by the access door, the access door having a mounting rib integrated therein, the hinge door and spring assembly comprising:

a unitary primary support element having at least one first hinge member and a spring support member;

at least one door mounting member, the at least one door mounting member being secured to the mounting rib of the at least one synthetic enclosure access door and comprising a spring mounting member and a second hinge member, the second hinge member of the at least one door mounting member being movably attached to the at least one first hinge member of the primary support element to form an articulating hinge joint; and, at least one spring member, the at least one spring member having first and second ends, the first end of the at least one spring member being secured to the spring support member of the primary support element, and the second end of the at least one spring member being secured to the spring mounting member of the at least one door mounting member.

2. A hinge, door, and spring assembly according to claim 1 wherein there are two synthetic enclosure access doors on the enclosure, and the enclosure has a pair of opposed second walls, each of the pair of opposed second walls being formed in part by the access doors and wherein:

the number of first hinge members on the primary support element is two;

the number of door mounting members is two, each door mounting member being secured to the mounting rib of one of the two synthetic enclosure access doors; and, the number of spring members is two, the second end of one of the two spring members being secured to the spring mounting member of one of the two door mounting members and the second end of the other of the two spring members being secured to the spring mounting member of the other of the two door mounting members.

3. A hinge, door, and spring assembly according to claim 1 wherein the door mounting member is a three sided member having mounting flanges adapted for mounting to the mounting rib of the door.

4. A hinge, door, and spring assembly according to claim 1 wherein the spring mounting member being a shape of a triangle wherein the spring is secured to an apex of the triangle.

5. A hinge, door, and spring assembly according to claim 1 wherein the spring is a gas spring.

6. A hinge, door, and spring assembly according to claim 1 wherein the primary support element is attached to the first wall of the enclosure and spring support member extends inward into the enclosure.

7. A hinge, door, and spring assembly according to claim 2 wherein the primary support element has a length that is approximately equal to a width of the enclosure.

8. A hinge, door, and spring assembly according to claim 1 wherein the first hinge element is secured to the second hinge element by a hinge pin.

9. A hinge, door, and spring assembly according to claim 1 wherein the spring mounting member goes over-center in a first direction relative to the spring member when the hinge is articulated in a first direction and the spring is extended, to support the door in an opened position, and the spring mounting element goes over-center in a second direction relative to the spring member when the hinge is articulated in a second direction and the spring is retracted, to maintain the door in a closed position.

* * * * *